US009441618B2

(12) United States Patent
Bucher et al.

(10) Patent No.: US 9,441,618 B2
(45) Date of Patent: Sep. 13, 2016

(54) FOOD DISPENSER AND METHOD FOR PORTIONING AND DISPENSING FREE-FLOWING FOODS

(71) Applicant: Unifiller Systems Uk Ltd., Northampton (GB)

(72) Inventors: Benno Bucher, Delta (CA); Kuno Kurschner, Delta (CA)

(73) Assignee: UNIFILLER SYSTEMS UK LTD, Northampton (GB)

( * ) Notice: Subject to any disclaimer, the term of this patent is extended or adjusted under 35 U.S.C. 154(b) by 0 days.

(21) Appl. No.: 14/381,613

(22) PCT Filed: Jun. 25, 2013

(86) PCT No.: PCT/EP2013/063216
§ 371 (c)(1),
(2) Date: Aug. 28, 2014

(87) PCT Pub. No.: WO2014/001296
PCT Pub. Date: Jan. 3, 2014

(65) Prior Publication Data
US 2015/0098850 A1 Apr. 9, 2015

(30) Foreign Application Priority Data
Jun. 28, 2012 (DE) .................. 10 2012 105 712

(51) Int. Cl.
B67D 7/58 (2010.01)
F04B 7/00 (2006.01)
G01F 11/02 (2006.01)
G01F 15/00 (2006.01)
F04B 15/02 (2006.01)

(52) U.S. Cl.
CPC ........... *F04B 7/0007* (2013.01); *F04B 7/0088* (2013.01); *F04B 15/02* (2013.01); *G01F 11/021* (2013.01); *G01F 15/005* (2013.01)

(58) Field of Classification Search
CPC .... F04B 7/0007; F04B 7/0088; F04B 15/02; G01F 11/021; G01F 15/005

USPC .................. 222/380; 137/625.46, 625.47
See application file for complete search history.

(56) References Cited

U.S. PATENT DOCUMENTS

| | | | |
|---|---|---|---|
| 2,032,163 | A | 2/1936 | Bagby |
| 3,032,163 | A | 8/1962 | Flieg |
| 5,108,014 | A | 4/1992 | Nordmeyer et al. |
| 5,127,547 | A | 7/1992 | Gerich |
| 5,441,173 | A | 8/1995 | Koval et al. |
| 2004/0129338 | A1 | 7/2004 | Rohret et al. |

FOREIGN PATENT DOCUMENTS

| | | |
|---|---|---|
| DE | 38 38 462 | 5/1990 |
| EP | 0279409 | 8/1998 |

OTHER PUBLICATIONS

International application PCT/EP2013/063216 search report dated Oct. 28, 2013.

*Primary Examiner* — Patrick M Buechner
*Assistant Examiner* — Jeremy W Carroll
(74) *Attorney, Agent, or Firm* — Bachman & LaPointe, P. C.

(57) ABSTRACT

Food dispenser for free-flowing food has a piston movable in a reciprocal manner in a cylinder by a drive and having a valve (2) having a valve body (5) which is rotatable about a rotational axis (7) between a first and a second switching position. In the first switching position, a first channel (14) of valve body (5) connects a suction opening (11) and a working opening of piston (12), such that a working stroke of the piston suctions food through suction opening (11) and working opening (12) into an intermediate space. In the second switching position, a second channel (15) of valve body (5) connects working opening (12) and a dispensing opening (13) such that a second working stroke of the piston conveys food from the cylinder through working opening (12) and dispensing opening (13). The suction opening (11), working opening (12) and dispensing opening (13) are offset, spaced from one another along rotational axis (7) of the valve body (5).

25 Claims, 3 Drawing Sheets

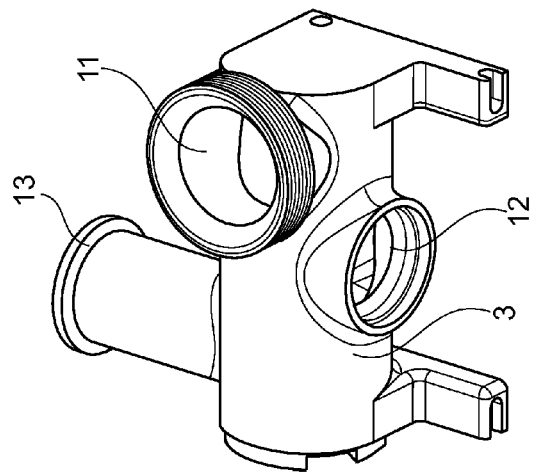
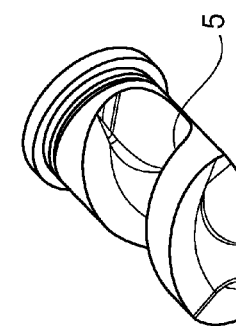
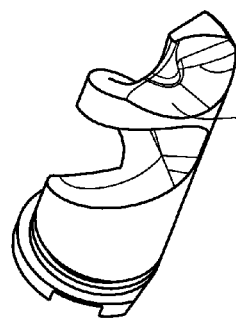
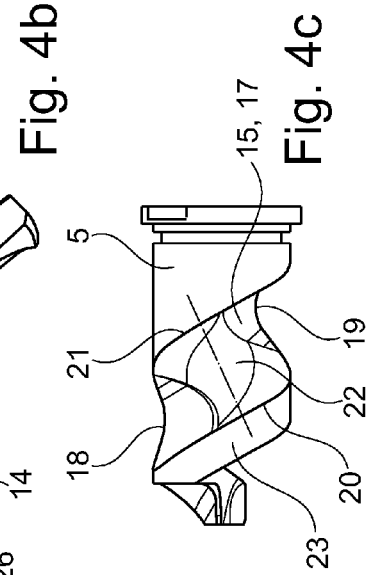
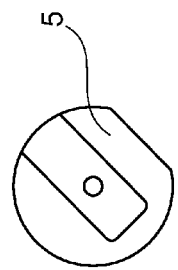
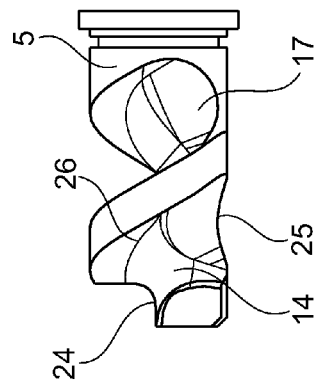
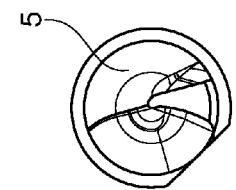

FOOD DISPENSER AND METHOD FOR PORTIONING AND DISPENSING FREE-FLOWING FOODS

BACKGROUND OF THE INVENTION

The invention relates to a food dispenser and a food portioning and dispensing method.

So-called food dispensers are used in the food industry in order to portion ready-made food products or ingredients from a store and to dispense the portion. Such dispensers are also used in commercial kitchens, bakeries and confectionery production, in particular in cake shops. By means of the known dispensers, not only dough but also, for example, cooked pasta, soups, bulk products, such as whipped cream or icing, or even meat may be portioned and dispensed.

Known food dispensers comprise a piston which is generally driven pneumatically and which serves to suction food into a cylinder in a first working stroke and to dispense the food portioned to the suctioned volume in a second stroke oriented in the opposing direction. A valve is assigned to the piston, during the first stroke said valve creating a connection between a suction opening and a working opening assigned to the piston and closing this connection before the start of the counterstroke and at the same time creating a connection between the working opening and a dispensing opening.

Hitherto, there were two different designs regarding the mode of operation of the valve used.

The oldest known design consists in rotating a valve body contoured in a substantially cylindrical manner between two switching positions, in this case the suction opening, the working opening and the dispensing opening being located at peripheral positions of a valve housing offset to one another by 90° but at the same axial position.

Food dispensers operating according to the aforementioned principle are disclosed in the US publications U.S. Pat. Nos. 2,032,163 A, 5,127,547 and 5,441,173.

In addition, a food dispenser is produced and distributed by the applicant in which the valve body is not rotatable but merely displaceable in an axially translatory manner between the two switching positions. Also, with such a valve configuration, the suction opening, the working opening and the dispensing opening are offset relative to one another by 90° at the same axial position of a valve housing enclosing the valve body.

Attempts have been made to increase the operating safety in food dispensers, namely in the case where a user inadvertently pushes a finger into one of the aforementioned openings during the operation of the device. Moreover, the food is intended to be conveyed with as little damage as possible.

A device for the metered filling of free-flowing products is disclosed in DE 38 38 462 A1, the device having a valve body which is not only movable in a purely rotatable manner, in contrast to a generic device—the valve body of the disclosed device is also able to be displaced in a translatory manner, which is to be avoided. A drawback with the disclosed device is the considerable risk of injury when the valve body is rotated, by fingers being cut off in the region of the openings.

A metering device is also disclosed in US 2004/129338 A1, in which a considerable risk of injury is present.

SUMMARY OF THE INVENTION

Proceeding from the aforementioned prior art, the object of the invention is to specify an improved food dispenser. Preferably, the food dispenser is intended to be designed such that the risk of injury is minimised. The object of the invention is also to specify a method for operating such an improved food dispenser.

This object is achieved with regard to the food dispenser and with regard to the method both as disclosed herein. Advantageous developments of the invention are also set forth. All combinations of at least two features disclosed in the description, the claims and/or the figures fall within the scope of the invention.

To avoid repetition, features disclosed in accordance with the device should apply and should be able to be claimed as being disclosed in accordance with the method. Similarly, features disclosed in accordance with the method should apply and should be able to be claimed as disclosed in accordance with the device.

The invention has identified that, in order to increase the operating safety, it would not be expedient to lengthen the lines and/or channels connected externally to the openings in order to prevent a user from being able to use the fingers to grip the region of the valve body, since, in particular, the suction power would be markedly reduced as a result. It would be particularly problematical to lengthen the line between a preferably provided food storage container, for example a tank or a hopper, and the suction opening, since as a result the critical suction path would be increased relative to the operating capacity.

The invention provides a different method whilst maintaining the rotational principle of the valve body. In other words, in the dispenser according to the invention the valve body is also driven exclusively rotatably in order to be displaced between the two switching positions. As a result, a switching process using relatively low drive forces is possible. An axial displacement of the valve body does not take place. In a departure from the aforementioned prior art, the suction opening, the working opening and the dispensing opening are no longer located at the same axial position but arranged offset along the rotational axis of the valve body, in particular such that the surface centres of gravity (surface centres) of the cross-sectional surfaces of the suction opening, working opening and dispensing opening are spaced apart in the direction of the rotational axis. Particularly preferred is an embodiment of the dispenser according to which the aforementioned openings are spaced apart along the rotational axis.

This design of the dispenser valve according to the invention is initially surprising as the axial offset of the openings has to be exclusively overcome by rotation and specifically not by axial displacement of the valve body when the valve body is displaced between its two switching positions. In other words, the food channels of the valve (fluid connections) have to be designed geometrically such that in spite of an exclusively rotational displacement of the valve body between the switching positions, said food channels overcome an axial offset of the opening, it being particularly preferred if this is implemented by at least one channel forming a fluid connection, configured as a groove, preferably both channels respectively configured as a groove, extending at the same time in the axial and peripheral direction, in particular such that at least one side wall of at least one channel continuously and/or slidably (preferably simultaneously from the axial and the peripheral direction) covers the associated opening of the channel during a rotation of the valve body and at the same time moves a finger which is potentially located in the opening region, so that the user has sufficient time to pull out the finger. As a whole, by means of the invention a user may be at least substantially prevented from coming into contact with the cutting and/or cutting-off regions of the valve body.

Such a configuration also provides the advantage that, when changing between the switching positions, lumpy, free-flowing food, i.e. which is able to be suctioned and/or conveyed by the dispenser, is cut to a lesser extent than is the case in the prior art.

By the axially offset, in particular spaced-apart, arrangement of the openings, the channels, at least one channel thereof being configured as a groove, as mentioned above, preferably have to extend simultaneously in the axial and in the peripheral direction. This has the result that, in spite of an exclusively rotational movement of the valve body between the switching positions, the channels are displaced relative to the openings assigned to the channels in a combined rotational and translatory movement, whereby the risk of injury is substantially reduced. This also preferably results in the channel ends, which have a cutting action and/or the channel walls which are assigned to these ends and which delimit the channel relative to its longitudinal extent, in any case the contour portions not extending parallel to the rotational axis (cutting contour portions) of the channel ends which are preferably contoured in an arcuate manner, also partially covering the respectively assigned opening, but only in a combined translatory/rotational movement, whereby the risk of injury is further reduced.

In other words, it is preferable if the channel ends and/or groove end portions, to be described in more detail below, at least in sections, in particular for the most part, do not extend parallel to the rotational axis but, for example, are contoured in an arcuate and/or curved manner, so that a purely rotational movement of the valve body relative to the channel ends and/or groove end portions in relation to the respectively assigned opening results in a combined rotational and translatory (relative) movement in order to minimise further the risk of injury.

There are various options with regard to the geometric design of the channels forming the fluidic connections. According to the invention, it is provided that at least one side wall defining the associated fluidic connection in the axial direction of a channel configured as a groove, extends obliquely, in particular in a curved manner, relative to the longitudinal extent of the rotational axis, and/or extends obliquely, i.e. not perpendicular, and in this case describes an at least approximately helical path. It is particularly preferred if at least one side wall of each groove defining the respective groove in the axial direction (in the event of configuring both channels as externally open grooves) has a corresponding contour path. It is further preferred if in at least one groove both side walls opposing one another, and preferably extending parallel, describe a corresponding contour and/or follow a corresponding path. Quite particularly preferably, a centre axis of at least one groove, in particular the centre axes of both grooves, (in the event of the provision of two grooves) extends both in the axial and in the peripheral direction and is and/or are further preferably contoured in a helical manner. "Centre axis" in this case is understood as an axis and/or direction of the longitudinal extent of the groove, which connects together the surface centres and/or surface centres of gravity of the groove cross-sectional surfaces following one another in the direction of the longitudinal extent of the channel(s).

An aforementioned oblique, in particular curved, configuration of the channels and/or fluidic connections with reference to the longitudinal extent of the valve body is also able to be implemented in an embodiment in which the suction opening, the working opening and the dispensing opening are located at the same peripheral position in spite of their axial offset. It is particularly preferred, however, if at least two of the aforementioned openings, in particular all three openings are arranged offset relative to one another in the peripheral direction, in particular such that their cross-sectional surface centre of gravity is spaced apart in the peripheral direction. Quite particularly preferred is an embodiment in which at least two of the aforementioned openings, in particular all of the aforementioned openings, are spaced apart from one another in the peripheral direction, it being further preferred if in each case two of the aforementioned openings are offset by 90° in the peripheral direction. Such a configuration particularly advantageously permits a path of at least one of the channels extending in the axial and the peripheral directions, in particular both channels, which leads to a minimised risk of injury and to less cutting of food.

Quite particularly preferred is an embodiment of the valve of the dispenser in which a short switching path of the valve body is maintained between the two switching positions, it being particularly expedient if the three openings are arranged relative to one another such that the valve body has to be displaced by less than 180°, preferably considerably less than 180°, between the two switching positions. It is particularly expedient if the valve body has to cover a peripheral angle of 120° or less, quite particularly preferably of 90° or less. A peripheral angle of 90° to be covered is particularly advantageous for a preferred development of the invention, according to which the valve body is displaced in the manner of a crank drive by means of a lever connected in an articulated manner to the valve body, said lever being able to be driven pneumatically, hydraulically or by means of an electric actuating motor, but a pneumatic drive being preferred for reasons of robustness.

With regard to the arrangement of the suction opening, the working opening and the dispensing opening, there are various options. Particularly expedient and preferable is an embodiment in which all three openings are arranged on the outer face in the valve housing receiving the valve body. It is also possible to arrange one of the openings, for example, on the front face in the valve housing and preferably the other two openings on the outer face. It has proved particularly expedient to arrange the working opening axially between the suction opening and the dispensing opening.

Hitherto, reference was exclusively made to a suction opening, a working opening and a dispensing opening, which may be connected together in a suitable manner via the valve. An embodiment of the dispenser with respectively one of the aforementioned openings is the simplest embodiment. Alternatively, it is possible to provide a plurality of groups respectively comprising the aforementioned three openings and to arrange them axially one behind the other, a common valve body being preferably provided for at least two such groups, preferably all groups. An arrangement with a plurality of groups has a plurality of pistons spaced apart from one another in the axial direction, preferably in parallel, preferably cooperating with one respective working opening. If only one group is provided, it is particularly preferred if the valve housing is configured to be closed in the front end region axially opposing the free end of the valve body, or alternatively has one of the aforementioned openings. In any case, such a configuration permits the valve body to be sealed relative to the valve housing by means of at least one annular seal made of elastomeric material, exclusively in an axial region between the aforementioned group of openings and the end of the valve body on the drive side.

In particular, an annular seal made of an elastomeric material is also not provided on the side of the group of openings remote from the end on the drive side, as this is not necessary, in comparison with the dispensers of the prior art. In the case of the provision of a plurality of axially adjacent groups of openings, if required, an annular seal may be provided between two adjacent groups of openings—but this is not necessarily required or desired. According to a development, in any case an annular seal is not provided at the end, which is remote from the end of the valve body at the drive side, of the opening group (on the end face) axially furthest away from the drive. In all of the aforementioned variants of the valve (with one or more opening groups) it is preferable if the valve body terminates with its free end, i.e. remote from the end on the drive side, in the valve housing, which is preferably closed on the end face, as already mentioned, i.e. has a blind hole into which the valve body is introduced. Alternatively, one of the three openings is provided on the front face at the end, in particular the dispensing opening or the suction opening. Preferably, in both embodiments at least one annular seal is exclusively provided in the region of the end on the drive side.

In order to avoid during the suction step of the piston a suction of food from the dispensing opening and in the second switching position during a dispensing stroke of the piston a dispensing of food through the suction opening, according to a development it is provided that in the first switching position the working opening is not fluidically connected to the dispensing opening and/or in the second switching position the working opening is not fluidically connected to the suction opening.

In principle, it is possible to configure the first or the second fluidic connection as a circumferentially closed bore and/or as a circumferentially closed through-hole and/or channel in the valve body. According to the invention, it is provided to configure the first and/or the second fluidic connection, i.e. the first and/or the second channel, as a groove in the valve body which is open outwardly in the direction of the valve housing, the groove inlet and outlet of the respective groove being offset in the axial direction, in particular being spaced apart. It is quite particularly expedient if a groove end portion of the first groove preferably assigned to the working opening and an initial groove portion of the second groove preferably also assigned to the working opening are arranged at the same axial position for alternate interaction with the working opening, but spaced apart in the peripheral direction, in particular by a distance measured in the peripheral direction of at least 5 mm, preferably of at least 1 cm, quite particularly preferably this distance being at least the diameter of the working opening in the peripheral direction.

As already mentioned, according to the invention it is provided that at least one of the channels, preferably both of the channels, during a purely rotational movement of the valve body relative to the openings assigned thereto, perform a combined rotational and translatory movement in spite of a purely rotational movement of the valve body. As a result, in the case of at least one of the channels being formed as a groove, during a purely rotational movement of the valve body, the at least one groove, preferably both grooves, move relative to the openings assigned thereto in a combined rotational and translatory movement (rotational in the peripheral direction about the rotational axis and translatory relative to the longitudinal extent of the valve.)

Preferably, during such a combined rotational and translatory movement at least one groove end portion of the at least one groove, preferably both groove end portions, in particular of both grooves, also move in a rotational and translatory movement relative to the opening assigned to the respective groove end. The groove end portions, which define the grooves substantially transversely to the longitudinal extent of the respective groove, form the channel and/or groove end portions, which ultimately during their displacement movement represent the greatest risk of danger. The combined rotational and translatory movement of the channel ends and/or groove end portions, more specifically the contour portions (cutting edges) of the channel and/or groove end portions not extending parallel to the rotational axis, relative to the respectively assigned opening, thus results in an oblique movement and/or displacement movement relative to the respective opening so that the risk of injury is markedly reduced.

According to a particularly simple embodiment of the valve body, it is provided that a fluidic connection at the end face is preferably delimited by an upper front face of the valve body which is arranged, in particular, so as to be chamfered. In other words, the front face of the valve body is preferably located in a plane which is intersected by the rotational axis at an angle deviating by 90°.

It is particularly preferred if a channel on the end face is delimited relative to the end of the valve body, remote from the end on the drive side, on the one side of the valve body facing the drive, and on the opposing axial side of the front face of the valve housing which is preferably closed or comprising one of the openings. In this case, it is particularly expedient if this channel on the end face on the valve body side is delimited by a helical portion of the valve body which preferably at least in sections only on the side facing the drive end of the valve body has an, in particular, helical side wall formed by the valve body. The helical portion is preferably spaced apart from the internal periphery of the valve housing at least partially over the entire periphery. In other words, it is preferred if a channel on the end face is partially delimited only on the side facing the drive of the valve body by a helical side wall formed by the valve body. Axially opposite, the fluidic connection and/or the channel is preferably delimited at least partially by the internal front face of the valve housing.

In a development of the invention, it is advantageously provided that the valve body is configured and arranged relative to the dispensing opening and/or the suction opening such that the valve body does not completely close and/or cover the suction opening or the dispensing opening in either of its switching positions and preferably also not on its path between the switching positions. This may be implemented, for example, by the valve body, in particular with an aforementioned helical portion, terminating before the axial end of the relevant opening at an end of the valve body remote from the end on the drive side. However, it is also possible that the valve body in the region of the relevant opening has a reduced diameter, preferably over the entire periphery, i.e. is radially spaced apart from the internal periphery of the valve housing, preferably over the entire periphery, so that a complete covering of the corresponding opening from the inside is avoided. The last-mentioned embodiment is also able to be implemented, in particular, when a plurality of three sets of openings are switched at the same time by means of the valve body. As the suction opening and/or the dispensing opening, in particular the suction opening, is not able to be completely covered by the valve body and/or a correspondingly contoured outer surface of the valve body, the risk of injury is further reduced.

The invention also relates to a method for portioning and dispensing free-flowing food by using a dispenser according to the invention, "free-flowing food" being understood as all food which is able to be conveyed by a device according to the invention.

In particular, the food is intended to be slideable, such as for example cooked pasta, hotpots or even pieces of meat. The size and/or the volume of the portion to be metered and/or dispensed may be varied by adjusting the stroke path of the piston.

According to the method according to the invention, by means of the piston, in the first switching position of the valve, a suctioning action is applied to the suction opening and then [food] is transported via the first fluidic connection in the axial direction to the working opening and passed therethrough into an intermediate space, preferably delimited by a cylinder assigned to the piston. In the second switching position, the valve body having to be rotated to reach said position, the food passes through the working opening into the second fluidic connection and flows via said connection in the axial direction to the dispensing opening and through said opening.

BRIEF DESCRIPTION OF THE DRAWINGS

Further advantages, features and details of the invention are revealed from the following description of preferred exemplary embodiments and with reference to the drawings, which show in:

FIG. 4a to FIG. 4f: different views of the valve body according to FIGS. 1 and 2.

DETAILED DESCRIPTION

Figure 1:
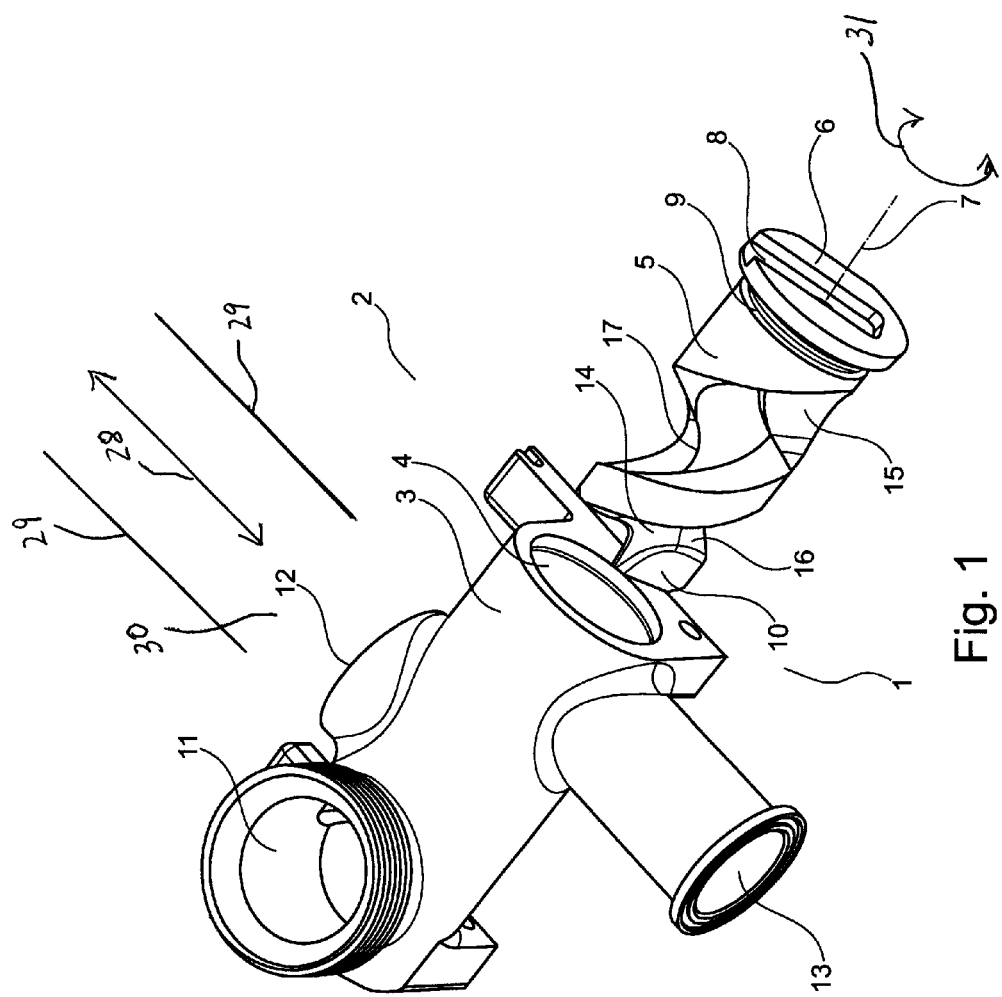
FIG. 1: in an exploded view a detail of a food dispenser comprising a dispenser valve with a valve housing and a valve body driven exclusively rotatably therein.

The same elements and elements which have the same function are identified by the same reference numerals in the figures.

Figure 2:
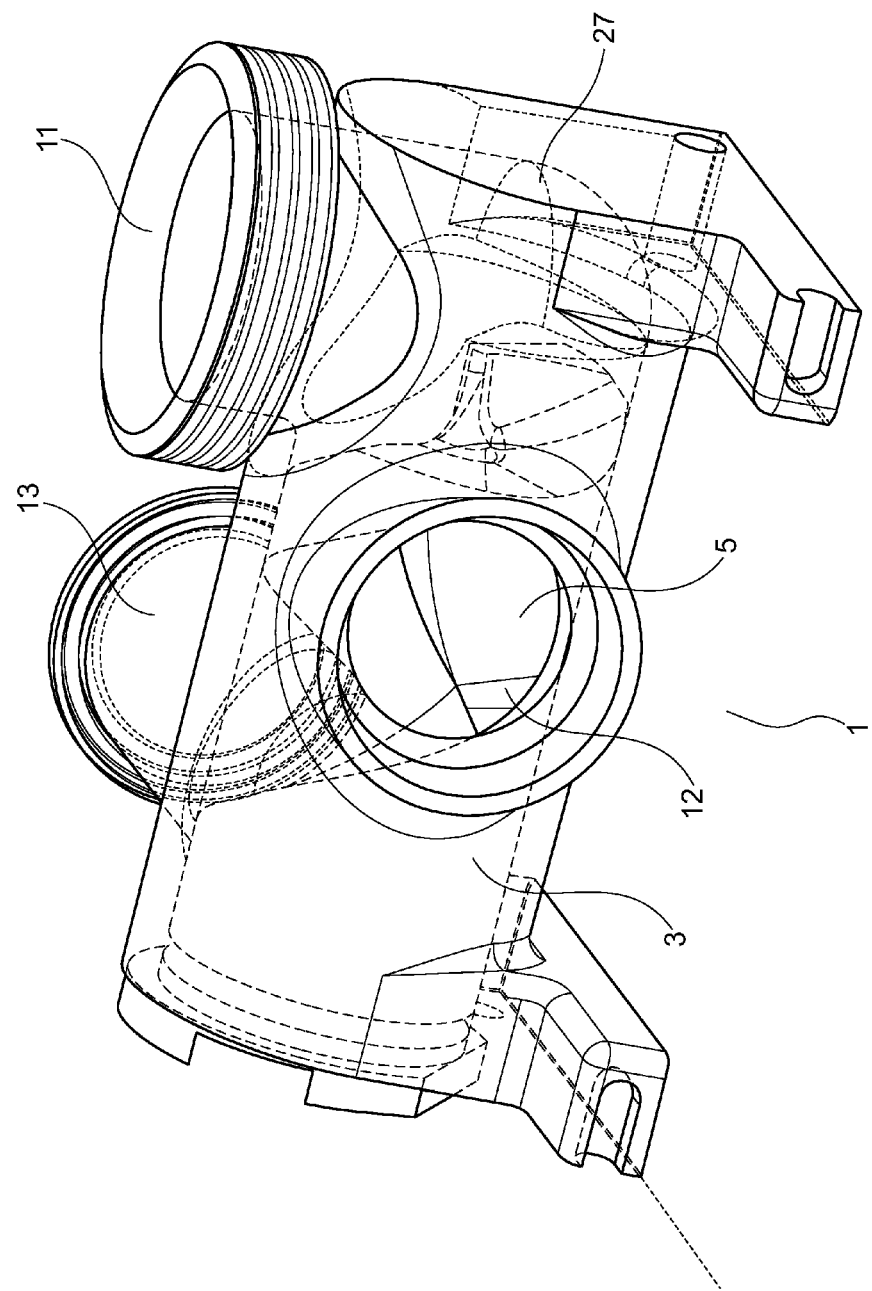
FIG. 2: the valve housing according to FIG. 1 with the valve body arranged therein according to FIG. 1, FIG. 3: the valve body according to FIGS. 1 and 2 in on its own

In FIGS. 1 and 2 is shown a detail of a food dispenser 1. Said food dispenser comprises a (dispenser) valve 2 with a housing 3, designed in this case from metal, comprising a receiver opening 4 on the front face produced as a blind hole for a rotatable valve body 5. The valve body 5 has an end 6 on the drive side which, when the device is fully mounted, is operatively connected to a rotary drive (schematically illustrated at arrow 31) for rotating and/or for pivoting the valve body 5 about a rotational axis 7 extending in the direction of the longitudinal extent of the valve body 5. A possible rotary drive for rotating the valve body 5 between two switching positions is known per se and preferably configured as a crank drive, in practice a drive plate (not shown) being able to be inserted fixedly in terms of rotation into a recess 8 on the front face and, for example, being able to be secured by a screw connection, said drive plate being connected in an articulated manner to a drive rod which in turn is preferably operatively connected to a linear drive or a rotary electric motor, such that the valve body 5 is pivotable inside the housing 3, in the exemplary embodiment shown by 90° in reciprocal motion.

It may be identified that the valve body 5 in the region of its end 6 on the drive side comprises a peripheral groove 9 in which an annular seal made of elastomeric material configured, for example, as an O-ring seal may be received in order to seal the valve body 5 relative to the housing 3, in order to avoid thereby an axial exit of food through the receiver opening 4. It may be seen that an elastomeric annular seal is not provided in the region of the free end 10 opposing the end 6 on the drive side.

It may be identified now from viewing FIGS. 1 and 2 together that the housing 3 (valve housing) in addition to the receiver opening which is permanently closed during operation, has three further openings, namely a suction opening 11 on the end face in the exemplary embodiment shown, a working opening 12, as well as a dispensing opening 13. Each of the openings 11, 12, 13 is assigned a housing connector, the housing connector of the suction opening 11 bearing an external thread in order to form a connection with a storage container, for example a hopper, a tank or any other container from which food may be suctioned. The working opening 12 which is arranged axially between the suction opening 11 and the dispensing opening 13, in a manner known per se, cooperates with a piston (schematically illustrated as double headed arrow 28) which during a suction stroke along an axis oriented perpendicular to the rotational axis 7 suctions food through the working opening 12 and during a counter stroke dispenses food in the direction of the dispensing opening 13. Independently of the exemplary embodiment shown, the displacement axis of the at least one piston 28 and the rotational axis of the valve body may preferably be arranged perpendicular to one another. The working opening 12 is assigned an intermediate space 30, preferably configured in the cylinder 29 for the piston, the volume thereof being able to be adjusted by the stroke path of the piston. For example, the piston arrangement may be implemented as shown in U.S. Pat. No. 2,032,163.

The valve body 5 defines two channels, forming in each case a fluidic connection, namely a first channel 14 which is arranged in the exemplary embodiment shown on the end face of the valve body 5 and which in the first switching position connects the suction opening 11 with the working opening 12 axially spaced-apart therefrom and a second channel 15 which in the second switching position connects the working opening 12 to the dispensing opening 13 axially spaced apart therefrom. Both channels 14, 15 are configured as an outwardly open first and/or second groove 16, 17 on the external periphery of the valve body 5, the fluidic connections 14, 15 and/or the grooves 16, 17 forming said connections extending both in the axial direction and also in the peripheral direction relative to their longitudinal extent.

For the sake of completeness, with reference to FIG. 2 it should be pointed out that here the valve body 5 is located in the second switching position, in which via the second channel 14 a fluidic connection is created from the working opening 12 to the dispensing opening 13, the helical longitudinal extent of the second channel 14 and/or the groove path continuing both axially and in the peripheral direction, in order to bring together the axially spaced-apart openings 12, 13 for conveying food by a fluidic connection. In the second switching position, there is no connection between the working opening 12 and the upwardly oriented suction opening 11. In order to reach, from the second switching position, a first switching position in which the first channel 15 connects the suction opening 11 with the working opening 12, the valve body has to be rotated by 90° around its rotational axis.

Now the construction of the valve body 5 and its cooperation with the three openings 11, 12, 13 in the two switching positions will be described with reference to FIGS. 4*a* to 4*f*. As already mentioned, the second channel 15 is formed by a second groove 17 which has a curved initial groove portion 18 assigned to the working opening 12 and a second groove end portion 19 spaced apart in the direction of the longitudinal extent of the groove. The initial groove portion 18 and groove end portion 19 are spaced apart from one another in the peripheral direction and in the axial direction. The second groove 17 in the axial direction is delimited by two opposing side walls 20, 21 extending parallel to one another, in the exemplary embodiment shown, and which over the greatest portion of their longitudinal extent are designed to be helical, along the longitudinal extent of the groove 17. It may also be identified that the side walls 20, 21 are curved in the transition region with a groove base 22 of the second groove 17 and namely in a sectional view, not shown, extending perpendicular to the longitudinal extent along the illustrated cutting line 23.

The first channel 14 separated from the second channel 15 is also delimited by the valve body 5, a corresponding recess and/or groove having a first initial groove portion 24 and a first groove end portion 25, the groove end portion 25 in the first switching position cooperating with the working opening 12 and the first initial groove portion 24 cooperating with the suction opening 11. The first groove 16 and/or the first channel 14 is only delimited in an end region on both sides of the valve body 5. In the remaining region, the first channel 14 is only delimited by a side wall 26 of the valve body 5 on the drive side, and on the opposing side by an internal end and/or an inner front face 27 (see FIG. 2) of the housing 3. The valve body 5 is not able to cover the suction opening completely but is reduced in diameter over the entire periphery in the region of the suction opening and additionally terminates before the axial end of the suction opening.

During a displacement movement of the valve body 5 between its two switching positions, the grooves 16, 17 and/or the channels 14, 15 at least partially formed in the valve body 5, slidably and/or slowly cover the corresponding openings. When viewing the openings, the grooves cover said openings obliquely i.e. by a combined axial and peripheral movement (relative to the openings). This is due to the longitudinal extent of the fluid channels extending both in the peripheral direction and in the axial direction, whereby an obstruction, such as for example the finger of a user, is slowly pushed out to the side and in particular axially out of the respective opening, so that the risk of injury is reduced. At the same time, advantageously the food is protected and/or cut to a substantially lesser degree than is the case in the prior art.

The aforementioned combined rotational and translatory movement of the grooves refers also, in particular, to the initial groove portions 18, 24 and groove end portions 19, 25, more specifically to the portions thereof contoured in an arcuate manner. These groove end portions and initial groove portions are formed from and/or face toward cutting edges which in conventional dispensers may lead to injuries. The combined rotational and translatory displacement movement minimises this risk of injury, notwithstanding the initial groove portions and groove end portions and notwithstanding a purely rotational displacement movement of the valve body.

The invention claimed is:

1. Food dispenser for portioning and dispensing free-flowing food, comprising a piston which is able to move in a reciprocal manner in a cylinder by means of a drive and having a valve (2) comprising a valve body (5) which is able to be rotatably driven exclusively about a rotational axis (7) between a first and a second switching position, in the first switching position by means of a first channel (14) delimited by the valve body (5) a fluidic connection being created between a suction opening (11) and a working opening assigned to the piston (12), such that by means of a working stroke of the piston, food is able to be suctioned through the suction opening (11) and the working opening (12) into an intermediate space, which in particular is formed in the cylinder, and in the second switching position by means of a second channel (15) delimited by the valve body (5), a fluidic connection being created between the working opening (12) and a dispensing opening (13) such that by means of a second working stroke of the piston in a second axial direction counter to the first axial direction, food is able to be conveyed from the cylinder through the working opening (12) and the dispensing opening (13), the suction opening (11), the working opening (12) and the dispensing opening (13) being arranged offset, spaced apart from one another, along the rotational axis (7) of the valve body (5), wherein the first channel (14) is configured as an outwardly open first groove (16) and wherein at least one side wall (20, 21) of the first groove is/are helical and/or wherein the second channel is configured as an outwardly open second groove (17) and wherein at least one side wall (20, 21) of the second groove is/are helical.

2. Dispenser according to claim 1, wherein at least one side wall(s) (20, 21) formed by the rotatable valve body (5), which define(s) the first or the second groove (14, 15) in the axial direction, is/are helical over the largest part of their longitudinal extent along the associated groove.

3. Dispenser according to claim 2, wherein both side walls (20, 21) are helical over the largest part of their longitudinal extent along the associated groove.

4. Dispenser according to claim 1, wherein at least one groove end portion of the first and/or the second groove have contour portions not extending parallel to the rotational axis.

5. Dispenser according to claim 4, wherein both groove end portions have contour portions not extending parallel to the rotational axis.

6. Dispenser according to claim 1, wherein the suction opening (11) and the working opening (12) and/or the working opening (12) and the dispensing opening (13) and/or the suction opening (11) and the dispensing opening (13) are offset in the peripheral direction, spaced apart.

7. Dispenser according to claim 1, wherein the valve body (5) is able to be rotated between the first and the second switching positions by a peripheral angle of less than 180°.

8. Dispenser according to claim 7, wherein the peripheral angle is less than 120°.

9. Dispenser according to claim 7, wherein the peripheral angle is less than 90°.

10. Dispenser according to claim 7, wherein the peripheral angle is more than 40°.

11. Dispenser according to claim 1, wherein the suction opening (11) and the working opening (12) and the dispensing opening (13) are arranged on the outer face in a valve housing (3) receiving the valve body (5), or wherein at least one of the aforementioned openings (11, 12, 13) is arranged on the outer face in the valve housing (3) and another of the aforementioned openings (11, 12, 13), in particular the suction opening (11) or the dispensing opening, is arranged on the front face in the valve housing (3).

12. Dispenser according to claim 1, wherein the suction opening (11), the working opening (12) and the dispensing opening (13) form the only fluid opening group of the valve body (5) and the valve body (5) is exclusively sealed in a region between this group and the drive relative to the valve housing (5), by means of at least one annular seal, or wherein at least two opening groups respectively comprising three openings (11, 12, 13) are provided, one thereof forming a last group relative to the axial extent of the valve housing (5), said group being arranged in the region of the end of the valve body housing (3) on the drive of the valve body (5) and wherein the valve body (5) is axially sealed only in a region between the last group and the drive relative to the valve housing (3) by means of at least one annular seal.

13. Dispenser according to claim 1, wherein in the first switching position the working opening (12) is not fluidically connected to the dispensing opening (13) and wherein in the second switching position the working opening (12) is not fluidically connected to the suction opening (11).

14. Dispenser according to claim 1, wherein a groove end portion (25) of the first groove (16) and an initial groove portion (18) of the second groove (17) for alternate interaction with the working opening (12) are at the same axial position but spaced apart in the peripheral direction, by a distance measured in the peripheral direction of at least 5 mm.

15. Dispenser according to claim 14, wherein the distance is at least 1 cm.

16. Dispenser according to claim 14, wherein the distance corresponds at least to the diameter of the working opening in the peripheral direction.

17. Dispenser according to claim 1, wherein the first and the second channel are spatially separated fluidically from one another via a wall portion of the valve body which is helical.

18. Dispenser according to claim 1, wherein at least one side wall (20, 21) at least partially, is/are contoured in a curved manner at least in a transition region with a groove base (22), over its entire vertical extent, in a cross-sectional view perpendicular to the longitudinal extent of the groove.

19. Dispenser according to claim 18, wherein the at least one side wall (20, 21) is/are contoured in said curved manner over at least a largest part of its longitudinal extent.

20. Dispenser according to claim 1, wherein the first or the second channel (14, 15) is delimited by a front face (27) of the valve body (5) which is chamfered.

21. Dispenser according to claim 1, wherein the first or the second channel (14, 15) is delimited by the valve body (5) and a front face (27) of the valve housing (3).

22. Dispenser according to claim 1, wherein the first or the second channel (14, 15) is delimited by a helical portion of the valve body on the end face and in an axially opposing manner by the valve housing (3).

23. Dispenser according to claim 1, wherein the valve body (5) is configured and arranged relative to the suction opening (11) or the dispensing opening (13) such that it does not completely cover said openings in either of the two switching positions, and not during its displacement movement between the switching positions.

24. Method for portioning and dispensing free-flowing food by using a device according to claim 1, free-flowing food being suctioned by means of the piston through the working opening (12) into the intermediate space in the first switching position of the valve (2), the food flowing via the first channel (14) and the suction opening (11), and in the second switching position of the valve (2) being forced out of the intermediate space by means of the piston through the working opening (12) into the second channel (15), through said channel as far as the dispensing opening (13) and through said dispensing opening.

25. Dispenser according to claim 1, wherein both opposing side walls (20, 21) of the first groove and/or both opposing side walls (20, 21) of the second groove are helical.

* * * * *